United States Patent
Nielson et al.

(10) Patent No.: US 12,449,564 B2
(45) Date of Patent: Oct. 21, 2025

(54) METASURFACE WITH AN ABSORPTIVE APERTURE BORDER

(71) Applicant: Moxtek, Inc., Orem, UT (US)

(72) Inventors: R. Stewart Nielson, Pleasant Grove, UT (US); Shaun Patrick Ogden, Saratoga Springs, UT (US); Bradley R. Willliams, Pocatello, ID (US)

(73) Assignee: Moxtek, Inc., Orem, UT (US)

( * ) Notice: Subject to any disclaimer, the term of this patent is extended or adjusted under 35 U.S.C. 154(b) by 329 days.

(21) Appl. No.: 18/353,568

(22) Filed: Jul. 17, 2023

(65) Prior Publication Data

US 2024/0061147 A1 Feb. 22, 2024

Related U.S. Application Data

(60) Provisional application No. 63/398,571, filed on Aug. 17, 2022.

(51) Int. Cl.
*G02B 1/00* (2006.01)
*G02B 5/00* (2006.01)
*G02B 5/26* (2006.01)
*G02B 5/28* (2006.01)

(52) U.S. Cl.
CPC ............ *G02B 1/002* (2013.01); *G02B 5/003* (2013.01); *G02B 5/26* (2013.01); *G02B 5/28* (2013.01)

(58) Field of Classification Search
CPC .......... G02B 1/002; G02B 5/003; G02B 5/26; G02B 5/28
See application file for complete search history.

(56) References Cited

U.S. PATENT DOCUMENTS

| | | | | |
|---|---|---|---|---|
| 9,632,224 | B2* | 4/2017 | Nielson | H04N 9/3167 |
| 11,024,767 | B2* | 6/2021 | Lopez | H10H 20/835 |
| 11,108,213 | B2* | 8/2021 | Lee | H01S 5/18375 |
| 11,206,978 | B2* | 12/2021 | Hu | A61B 3/12 |
| 11,233,332 | B2* | 1/2022 | Hong | G02B 6/12 |
| 11,610,868 | B2* | 3/2023 | Brick | H01L 25/0753 |
| 11,874,476 | B1* | 1/2024 | Kress | G02B 1/002 |
| 12,043,543 | B2* | 7/2024 | Hughes | B82B 3/0014 |
| 2014/0176570 | A1* | 6/2014 | Shi | G06T 1/20 438/57 |
| 2019/0339417 | A1* | 11/2019 | Dong | G02B 5/201 |
| 2019/0386749 | A1* | 12/2019 | Lezec | H04B 10/25137 |
| 2020/0025610 | A1* | 1/2020 | Chandrasekar | G01J 3/2803 |
| 2020/0135703 | A1* | 4/2020 | Ahmed | G02B 30/00 |
| 2020/0225386 | A1* | 7/2020 | Tsai | G02B 1/002 |
| 2021/0028215 | A1* | 1/2021 | Devlin | G02B 27/4244 |

(Continued)

FOREIGN PATENT DOCUMENTS

TW 202309581 A * 3/2023 ............ G02B 1/002

*Primary Examiner* — William Lu
(74) *Attorney, Agent, or Firm* — Thorpe North & Western, LLP

(57) ABSTRACT

A metasurface optical device can include an array of pillars 13 on a first-side 11f of a substrate 11 aligned with an aperture 15 of, or proximate to, a blocking-layer 12. The blocking-layer 12 can located on the first-side 11f of the substrate 11, on a second-side 11s of the substrate 11 opposite of the first-side 11f, or both. The blocking-layer 12 can prevent light from transmitting through the device in undesirable locations. The blocking-layer 12 can be opaque to incident light and can include an absorptive-layer. Thus, the blocking-layer 12 can have dual functions—blocking and absorbing light.

20 Claims, 5 Drawing Sheets

(56) References Cited

U.S. PATENT DOCUMENTS

| | | | |
|---|---|---|---|
| 2022/0018998 A1* | 1/2022 | Doshay | G02B 1/002 |
| 2022/0128734 A1* | 4/2022 | Meretska | G02B 1/002 |
| 2022/0252761 A1* | 8/2022 | Xia | G03F 7/70416 |
| 2022/0381963 A1* | 12/2022 | George | G02B 5/3058 |
| 2023/0012003 A1* | 1/2023 | Ma | G02B 7/021 |
| 2023/0067758 A1* | 3/2023 | Loh | G02B 5/003 |
| 2023/0079518 A1* | 3/2023 | Jain | G02B 5/0841 |
| | | | 359/287 |
| 2023/0221463 A1* | 7/2023 | Sun | G02B 1/002 |
| | | | 359/726 |
| 2024/0125975 A1* | 4/2024 | Dupre | G02B 1/002 |

* cited by examiner

METASURFACE WITH AN ABSORPTIVE APERTURE BORDER

CLAIM OF PRIORITY

This application claims priority to U.S. Provisional Patent Application No. 63/398,571, filed on Aug. 17, 2022, which is incorporated herein by reference.

FIELD OF THE INVENTION

The present application is related to optical metasurfaces.

BACKGROUND

Optical metasurfaces can manipulate a light wavefront without traditional lenses. They can include structures, such as pillars, ribs, or holes with subwavelength dimensions, on or in a substrate.

The structures can vary in size, shape, and spacing across a surface of the substrate. Each structure size, shape, and spacing can provide a unique electromagnetic response. The metasurface can provide desired light wavefront manipulation (phase, polarization, and amplitude) without the thickness of traditional lenses. The metasurface can overcome the aberration problem of traditional lenses.

The metasurface structures, which can be comparable in size to the light wavelength, can diffract incident light. The structures can have nanometer-sized dimensions. Instead of relying on curvature, like traditional lenses, metasurfaces rely on the dimensions and pattern of the structures to diffract the light in desirable patterns. The diffracted light waves can interfere with one another, forming the desired, altered wavefront.

The metasurface can focus light, collimate light, diffract light, diffuse light, change the polarization of light, or split white light into multiple, different colors. Metasurfaces can be used for miniaturizing and improving the quality of optical systems. Metasurfaces can reduce the number of optical components in a system. Metasurfaces can be adaptable to solve a broader variety of needs than traditional lenses. Metasurfaces can be used for detecting light intensity, depth-sensing, imaging, light dependent electronics, microspectrographs, security, and cryptography.

BRIEF DESCRIPTION OF THE DRAWINGS (DRAWINGS MIGHT NOT BE DRAWN TO SCALE)

Figure 1:
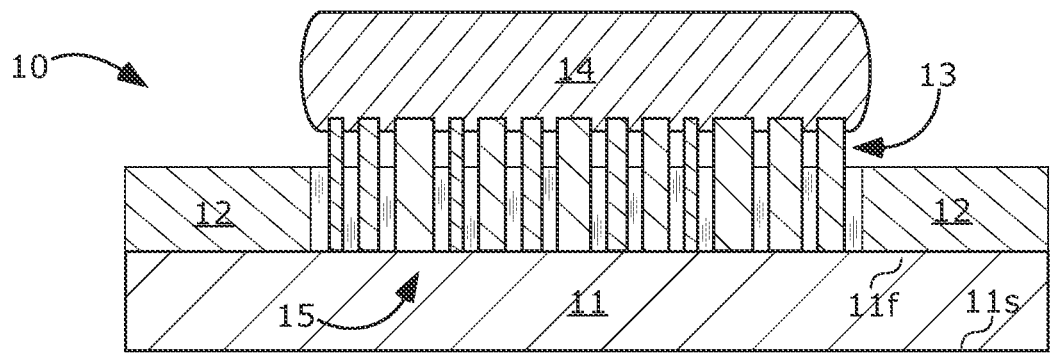

FIG. 1 is a cross-sectional side-view of a metasurface optical device with an array of pillars 13, on a first-side 11f of a substrate 11, aligned with an aperture 15 of a blocking-layer 12.

The blocking-layer 12 is located on the first-side 11f of the substrate 11. The blocking-layer 12 can include an absorptive-layer.

Figure 2:
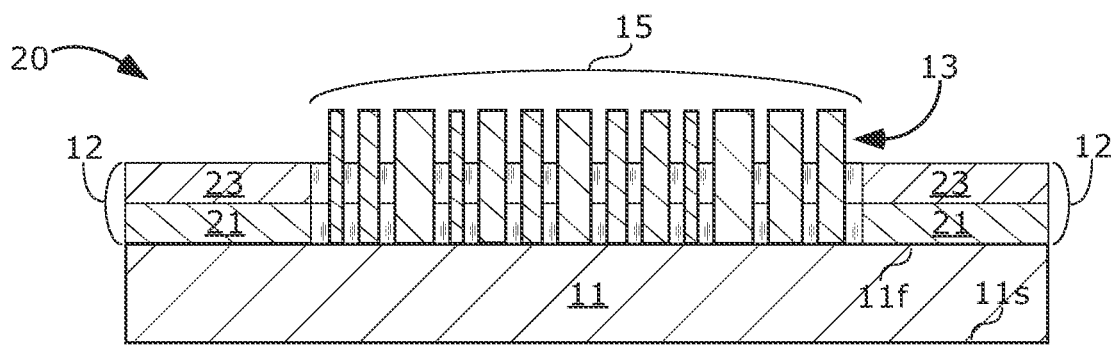

FIG. 2 is a cross-sectional side-view of a metasurface optical device 20, similar to device 10. The blocking-layer 12 in device 20 can include a proximal-layer 21 and a distal-layer 23.

Figure 3:
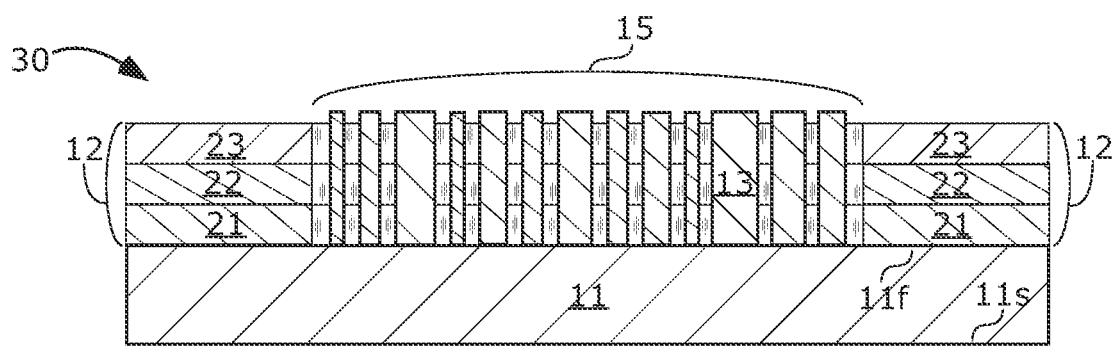

FIG. 3 is a cross-sectional side-view of a metasurface optical device 30, similar to devices 10 and 20. The blocking-layer 12 in device 30 can include a proximal-layer 21, an intermediate-layer 22, and a distal-layer 23.

Figure 4:
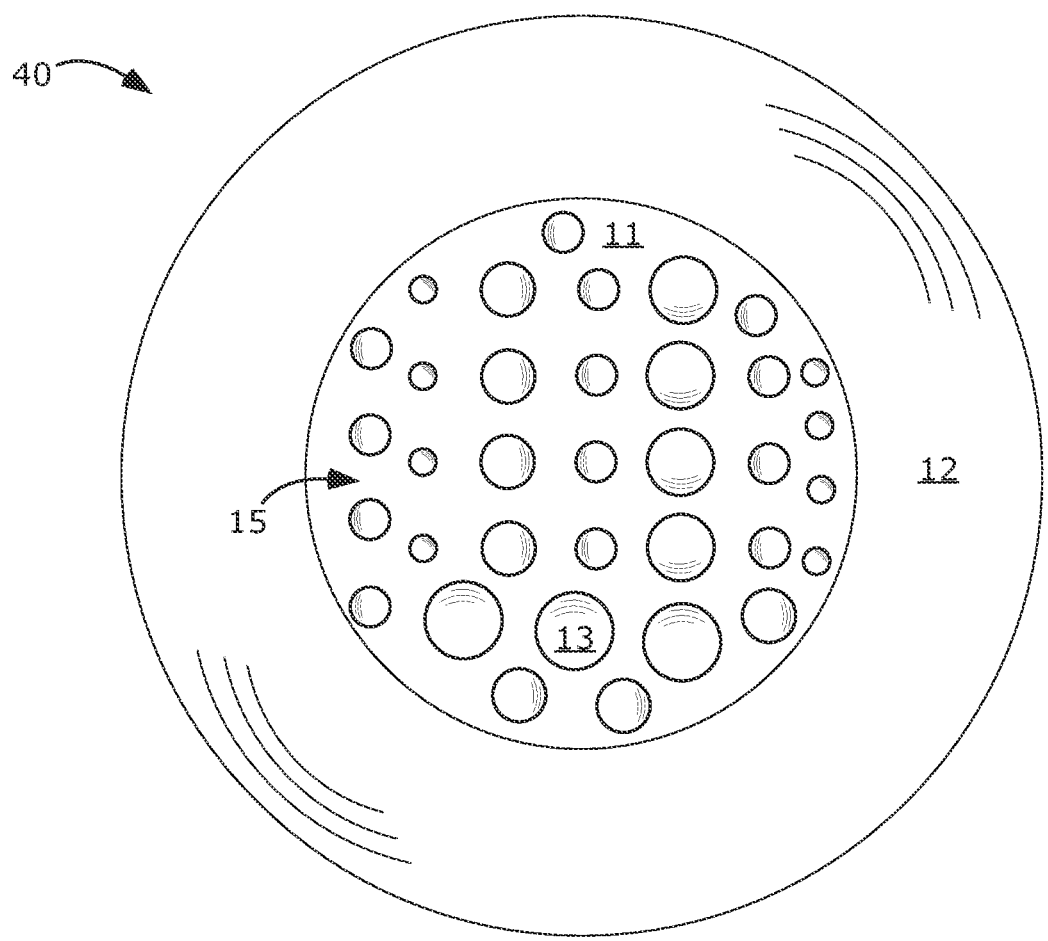

FIG. 4 is a top-view of a metasurface optical device 40, similar to devices 10, 20, and 30.

Figure 5:
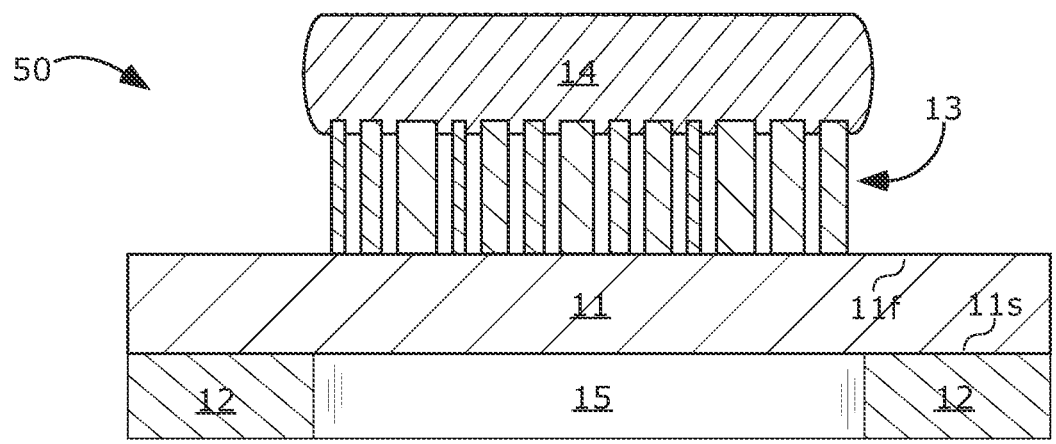

FIG. 5 is a cross-sectional side-view of a metasurface optical device 50 with an array of pillars 13, on a first-side 11f of a substrate 11, aligned with an aperture 15 of a blocking-layer 12. The blocking-layer 12 is located on a second-side 11s of the substrate 11. The second-side 11s is opposite of the first-side 11f. The blocking-layer 12 can include an absorptive-layer.

Figure 6:
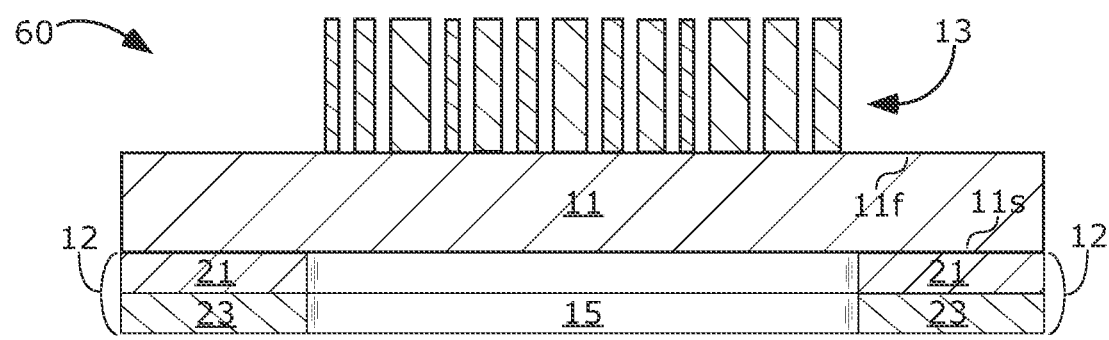

FIG. 6 is a cross-sectional side-view of a metasurface optical device 60, similar to device 50. The blocking-layer 12 in device 60 can include a proximal-layer 21 and a distal-layer 23.

Figure 7:
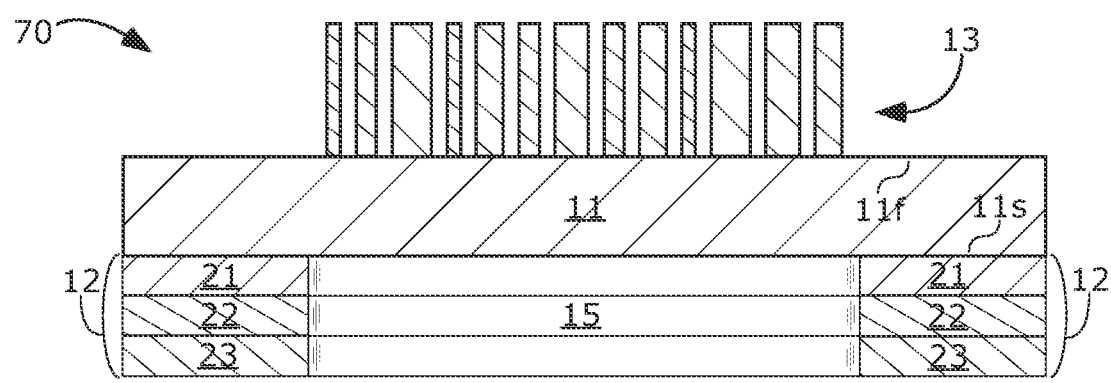

FIG. 7 is a cross-sectional side-view of a metasurface optical device 70, similar to devices 50 and 60. The blocking-layer 12 in device 70 can include a proximal-layer 21, an intermediate-layer 22, and a distal-layer 23.

Figure 8:
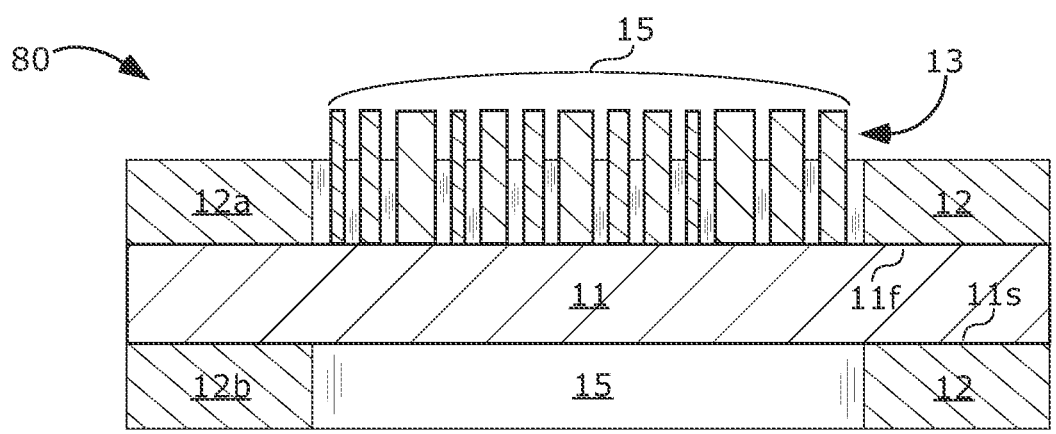

FIG. 8 is a cross-sectional side-view of a metasurface optical device 80 with an array of pillars 13, on a first-side 11f of a substrate 11, aligned with an aperture 15 of a first-blocking-layer 12a and a second-blocking-layer 12b. The first-blocking-layer 12a is located on the first-side 11f of the substrate 11, and the second-blocking-layer 12b is located on a second-side of the substrate 11, opposite of the first-side 11f. The first-blocking-layer 12a and the second-blocking-layer 12b can each include an absorptive-layer.

Figure 9:
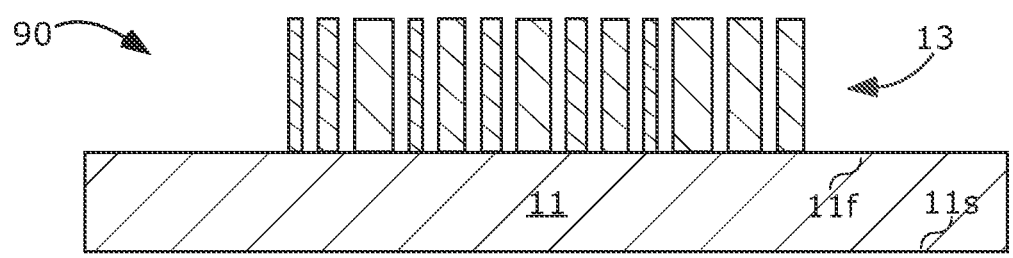

FIG. 9 is a cross-sectional side-view illustrating a step 90 in a method of making a metasurface optical device, including forming an array of pillars 13 on a first-side 11f of a transparent substrate 11.

Figure 10:
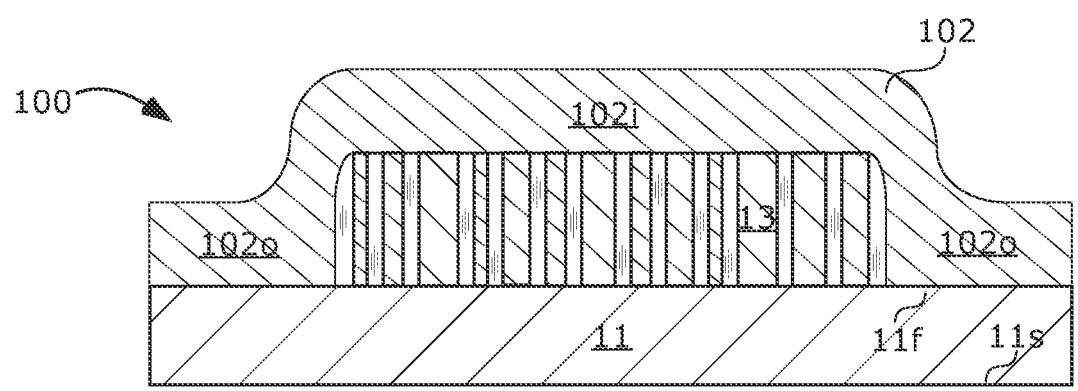

FIG. 10 is a cross-sectional side-view illustrating a step 100 in a method of making a metasurface optical device. Step 100 comprises applying a thin-film 102 on the array of pillars 13 and extending past borders of the array of pillars 13. The thin-film 102 can include an absorptive-film. An outer-ring 102o of the thin-film 102 can encircle the array of pillars 13. An inner-portion 102i of the thin-film 102 can cover the array of pillars 13.

Figure 11:
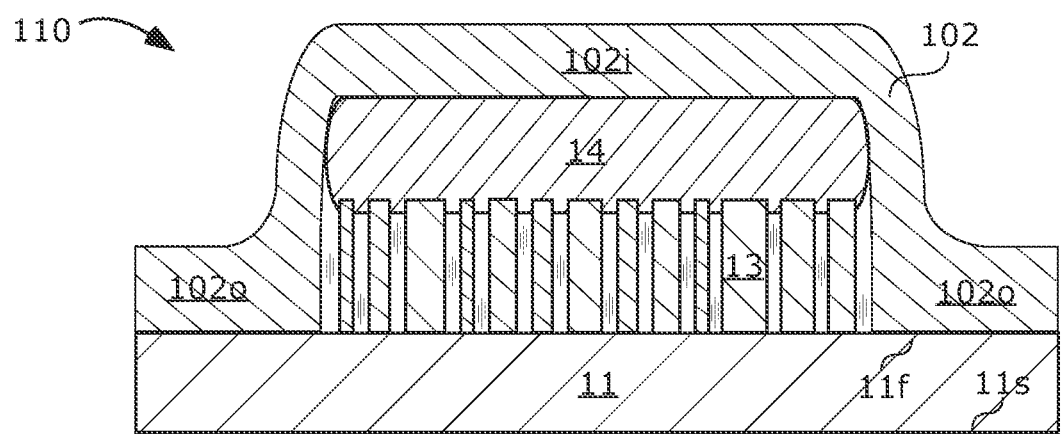

FIG. 11 is a cross-sectional side-view illustrating a step 110 in a method of making a metasurface optical device. Step 110 comprises applying an overcoat-layer 14 on the array of pillars 13, then applying a thin-film 102 on the overcoat-layer 14 and on the array of pillars 13 and extending past borders of the array of pillars 13. The thin-film 102 can include an absorptive-film. An outer-ring 102o of the thin-film 102 can encircle the array of pillars 13. An inner-portion 102i of the thin-film 102 can cover the array of pillars 13.

Figure 12:
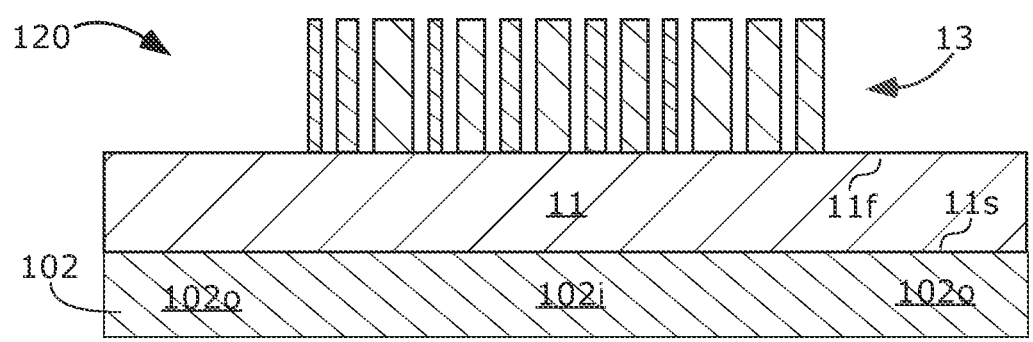

FIG. 12 is a cross-sectional side-view illustrating a step 120 in a method of making a metasurface optical device. Step 120 comprises applying a thin-film 102 on a second-side 11s of the transparent substrate 11. The thin-film 102 can include an absorptive-film. The second-side 11s is opposite of the first-side 11f. The thin-film 102 is opposite from and wider than the array of pillars 13.

REFERENCE NUMBERS IN THE DRAWINGS metasurface optical devices 10, 20, 30, 40, 50, 60, 70, 80
steps 90, 100, 110, 120 in a method of making a metasurface optical device
substrate 11
first-side 11f
second-side 11s
blocking-layer 12
first-blocking-layer 12a
second-blocking-layer 12b
array of pillars 13
overcoat-layer 14 aperture 15
proximal-layer 21
intermediate-layer 22
distal-layer 23
thin-film 102
inner-portion 102i
outer-ring 102o

DEFINITIONS

The following definitions, including plurals of the same, apply throughout this patent application.

As used herein, the term "encircle" is not limited to a circular shape, but includes any shape that surrounds the internal object.

As used herein, the term "nanometer-sized" means less than a micrometer.

As used herein, the terms "on", "located on", "located at", and "located over" mean located directly on or located over with some other solid material between. The terms "located directly on", "adjoin", "adjoins", and "adjoining" mean direct and immediate contact.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on bulk reflectance R, the refractive index n, and the extinction coefficient k. Equation 1 is used to determine the bulk reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

Unless explicitly noted otherwise herein, all n&k values (real part of the refractive index n and extinction coefficient k) are such value across a wavelength range from 450 nm through 700 nm.

Unless explicitly noted otherwise herein, all temperature-dependent values are such values at 25° C.

DETAILED DESCRIPTION

As illustrated in FIGS. 1-8, metasurface optical devices 10, 20, 30, 40, 50, 60, 70, 80 are shown comprising an array of metasurface structures on a first-side 11f of a transparent substrate 11. The metasurface structures, which can be pillars, ribs, or holes with subwavelength dimensions, are illustrated as an array of pillars 13. The array of pillars 13 can include different pillars with different diameters and/or different shapes with respect to each other. The pillars 13 can have nanometer-sized dimensions. The pillars 13 can have nanometer-sized spacing between each other.

Example materials for the array of pillars 13 include niobium oxide, titanium oxide, silicon nitride, or combinations thereof. The array of pillars 13 can have an index of refraction that is ≥1.8 across the visible spectrum of light.

As illustrated in FIGS. 1 and 5, an overcoat-layer 14 can be located on the array of pillars 13. The overcoat-layer 14 can span channels between the array of pillars 13 without filling the channels. The overcoat-layer 14 can adjoin the array of pillars 13. The overcoat-layer 14 can be transparent in the wavelength range of use. The overcoat-layer 14 can protect the array of pillars 13. Example materials for the overcoat-layer 14 include silicon dioxide, aluminum oxide, or both.

The array of pillars 13 can be aligned with an aperture 15 of a blocking-layer 12. The array of pillars 13 can occlude the aperture 15 of the blocking-layer 12. The array of pillars 13 can be located across the aperture 15 of the blocking-layer 12. The array of pillars 13 can be aligned with the aperture 15 of the blocking-layer 12. The array of pillars 13 can be proximate to the blocking-layer 12.

The blocking-layer 12 can prevent light from transmitting through the device in undesirable locations. The blocking-layer 12 can be opaque to incident light.

The aperture 15 can extend through the blocking-layer 12. The blocking-layer 12 can encircle the aperture 15. Although a circular aperture 15 of the blocking-layer 12 is illustrated in FIG. 4, the aperture 15 can have any desired shape. The aperture 15, due to providing an opening to expose the transparent pillars 13 and the transparent substrate 11, can allow light to transmit through the device.

The blocking-layer 12 can reflect light, which can interfere with the optical system. For example, the blocking-layer 12 can be made of aluminum. The blocking-layer 12 can include an absorptive-layer to absorb incident light, which can prevent or minimize such interference with the optical system. Thus, the blocking-layer 12 can have dual functions—blocking light and absorbing light. The absorptive-layer can comprise germanium, silicon, carbon, or combinations thereof.

As illustrated in FIGS. 1 and 5, the blocking-layer 12 can consist of or comprise the absorptive-layer in a single layer. This allows for simple manufacturing. This example is preferred if incident light, and light reflected within the substrate 11, should be absorbed. This example, however, is not preferred if the absorptive-layer is insufficiently opaque.

As illustrated in FIGS. 2 and 6, the blocking-layer 12 can include a proximal-layer 21 and a distal-layer 23. The proximal-layer 21, the distal-layer 23, or both can be an absorptive-layer. The proximal-layer 21 or the distal-layer 23 can be reflective of incident light. One of the proximal-layer 21 or the distal-layer 23 can be an absorptive-layer and the other of the proximal-layer 21 or the distal-layer 23 can be reflective. The reflective-layer can adjoin the absorptive-layer.

The proximal-layer 21 can be the absorptive-layer and the distal-layer 23 can be reflective. This can allow absorption of light reflected within the substrate 11. The absorptive-layer can adjoin the substrate 11.

Alternatively, the proximal-layer 21 can be reflective and the distal-layer 23 can be the absorptive-layer. This can allow absorption of light incident on the device 20 or 60. The reflective-layer can adjoin the substrate 11.

As illustrated in FIGS. 3 and 7, the blocking-layer 12 can include a proximal-layer 21, an intermediate-layer 22, and a distal-layer 23. The proximal-layer 21, the intermediate-layer 22, the distal-layer 23, or combinations thereof can be an absorptive-layer. For example, the intermediate-layer 22 can be reflective, and the proximal-layer 21 and the distal-layer 23 can be absorptive. This can allow absorption of light incident on the device 30 or 70, and absorption of light reflected within the substrate 11. The reflective-layer can adjoin both absorptive-layers.

As illustrated in FIGS. 1-3, the blocking-layer 12 can be located on the first-side 11f of the substrate 11. The blocking-layer 12 can encircle the array of pillars 13. A second-side 11s of the substrate 11, opposite of the first-side 11f, can be free of the blocking-layer 12, the array of pillars 13, or both.

As illustrated in FIGS. 5-7, the blocking-layer 12 can be located on the second-side 11s of the substrate 11. A first-side 11f of the substrate 11, opposite of the second-side 11s, can be free of the blocking-layer 12.

A choice of locating the blocking-layer 12 on the first-side 11f or on the second-side 11s can depend on direction of incident light, and how reflected light can interfere with the optical system.

As illustrated in FIG. 8, the blocking-layer 12 can include a first-blocking-layer 12a and a second-blocking-layer 12b. The first-blocking-layer 12a can be located on the first-side 11f of the substrate 11. The second-blocking-layer 12b can be located on the second-side 11s of the substrate 11. The first-blocking-layer 12a can include a first-absorptive-layer and the second-blocking-layer 12b can include a second-absorptive-layer.

The first-blocking-layer 12a can include a first-absorptive-layer and a reflective-layer (FIGS. 2 and 8 combined). The first-blocking-layer 12a can include a reflective-layer sandwiched between a first pair of absorptive-layers (FIGS. 3 and 8 combined).

The second-blocking-layer 12b can include a second-absorptive-layer and a reflective-layer (FIGS. 6 and 8 combined). The second-blocking-layer 12a can include a reflective-layer sandwiched between a second pair of absorptive-layers (FIGS. 7 and 8 combined).

The metasurface optical devices herein can be used in ultraviolet light, visible light, infrared light, or combinations thereof.

Method

A method of making a metasurface optical device can include some or all of the following steps:

Step 90 (FIG. 9) can include forming an array of pillars 13 on a first-side 11f of a transparent substrate 11.

Step 100 can include applying a thin-film 102, including an absorptive-film, on the array of pillars 13 (FIG. 10). The thin-film 102 can extend past borders of the array of pillars 13. An outer-ring 102o of the thin-film 102 can encircle the array of pillars 13. An inner-portion 102i of the thin-film 102 can cover the array of pillars 13.

Step 100 can further comprise removing the inner-portion 102i of the thin-film 102, thus forming the thin-film 102 into a blocking-layer 12 encircling the array of pillars 13 (FIGS. 10 and 1-4). The blocking-layer 12 can include an absorptive-layer. Step 100 can follow step 90.

Step 110 can include applying an overcoat-layer 14 on the array of pillars 13, then applying a thin-film 102 on the array of pillars 13 and on the overcoat-layer 14 (FIG. 11). The thin-film 102 can extend past borders of the array of pillars 13. An outer-ring 102o of the thin-film 102 can encircle the array of pillars 13. An inner-portion 102i of the thin-film 102 can cover the array of pillars 13. The thin-film 102 can include an absorptive-film.

Step 110 can further comprise removing the inner-portion 102i of the thin-film 102, thus forming the thin-film 102 into a blocking-layer 12 encircling the array of pillars 13 (FIG. 1). The blocking-layer 12 can include an absorptive-layer. Step 110 can follow step 90.

Step 120 (FIG. 12) can include applying a thin-film 102 on a second-side 11s of the transparent substrate 11. The second-side 11s is opposite of the first-side 11f. The thin-film 102 can be opposite from and wider than the array of pillars 13. The thin-film 102 can include an absorptive-film.

Step 120 can further comprise etching an inner-portion 102i of the thin-film 102 to form the thin-film 102 into a blocking-layer 12. The blocking-layer 12 can encircle an aperture 15 where light can transmit through the device to the array of pillars 13 (FIGS. 5-8). The blocking-layer 12 can include an absorptive-layer.

Removing the inner-portion 102i of the thin-film 102 can include applying a mask to protect the outer-ring 102o, then wet etching to remove the inner-portion 102i. Wet etch chemistry can include 75 weight percent phosphoric acid, 5 weight percent acetic acid, 5 weight percent nitric acid, and water making up a balance of the solution. Alternatively, HCl, HF, or NaOH can be used for this wet etch.

These steps can be performed in the above order or other order if so specified. Some of the steps can be performed simultaneously unless explicitly noted otherwise in the claims. Components of the x-ray window, made by this method, can have properties as described above the method description.

What is claimed is:

1. A metasurface optical device comprising:
   a transparent substrate including a first-side and a second-side opposite of the first-side;
   a blocking-layer on the substrate, the blocking-layer configured to block light from transmitting therethrough;
   an aperture extending through the blocking-layer, the blocking-layer encircling the aperture, and the aperture configured to allow light to transmit through the device;
   an array of pillars located on the first-side of the substrate and aligned with the aperture, the array of pillars including different pillars with different diameters with respect to each other; and
   the blocking-layer includes an absorptive-layer configured to absorb the light and a reflective-layer configured to reflect the light, the absorptive-layer includes a first-absorptive-layer and a second-absorptive-layer, and the reflective-layer is sandwiched between the first-absorptive-layer and a second-absorptive-layer.

2. The device of claim 1, wherein the blocking-layer is located on the first-side of the substrate.

3. The device of claim 1, wherein the blocking-layer is located on the second-side of the substrate.

4. The device of claim 1, wherein
   the blocking-layer includes a first-blocking-layer and a second-blocking-layer, the first-blocking-layer is located on the first-side of the substrate, and the second-blocking-layer is located on the second-side of the substrate.

5. The device of claim 1, wherein the reflective-layer adjoins the first-absorptive-layer and the second-absorptive-layer.

6. The device of claim 1, wherein the reflective-layer is sandwiched between the absorptive-layer and the substrate.

7. The device of claim 1, wherein k>0.1 and R≤0.6 for the absorptive-layers, where k is an extinction coefficient of the absorptive-layer, and R is a bulk reflectance of an interface between air and a uniform slab of the absorptive-layer at normal incidence, calculated by as follows:

$$R = \frac{(n-1)^2 + k^2}{(n+1)^2 + k^2}$$

and n is a refractive index of the absorptive-layer.

8. The device of claim 1, wherein the absorptive-layer adjoins the substrate.

9. The device of claim 1, wherein the first-absorptive-layer, the reflective-layer, and the second-absorptive-layer are located on the first-side of the substrate.

10. The device of claim 1, wherein the first-absorptive-layer, the reflective-layer, and the second-absorptive-layer are located on the second-side of the substrate.

11. A method of making the metasurface optical device of claim 1, the method comprising:
   forming the array of pillars on the first-side of the transparent substrate;
   applying a thin-film on the array of pillars and extending past borders of the array of pillars such that an outer-ring of the thin-film encircles the array of pillars and an inner-portion of the thin-film covers the array of pillars; and
   removing the inner-portion of the thin-film, thus forming the thin-film into the blocking-layer.

12. The method of claim 1, further comprising applying an overcoat-layer on the array of pillars before applying the thin-film, the overcoat-layer spans channels between the array of pillars without filling the channels, and the overcoat-layer is transparent in a wavelength range of use.

13. The device of claim 1, further comprising an overcoat-layer on the array of pillars, the overcoat-layer spans channels between the array of pillars without filling the channels, and the overcoat-layer is transparent in a wavelength range of use.

14. The device of claim 1, wherein the array of pillars have nanometer-sized dimensions and nanometer-sized spacing between each other.

15. The device of claim 1, wherein the first-absorptive-layer and the second-absorptive-layer each include germanium, silicon, carbon, or combinations thereof.

16. The device of claim 1, wherein the array of pillars comprises niobium oxide, titanium oxide, silicon nitride, or combinations thereof.

17. The device of claim 1, wherein the array of pillars has an index of refraction that is ≥1.8 across the visible spectrum of light.

18. A metasurface optical device comprising:
   a transparent substrate including a first-side and a second-side opposite of the first-side;
   a blocking-layer on the substrate, the blocking-layer configured to block light from transmitting therethrough;
   an array of pillars located on the first-side of the substrate adjacent to the blocking-layer, the array of pillars including different pillars with different dimensions with respect to each other; and
   the blocking-layer includes an absorptive-layer configured to absorb the light and a reflective-layer configured to reflect the light, the absorptive-layer includes a first-absorptive-layer and a second-absorptive-layer, and the reflective-layer is sandwiched between the first-absorptive-layer and a second-absorptive-layer.

19. The device of claim 18, wherein:
the first-absorptive-layer and the second-absorptive-layer each include germanium, silicon, carbon, or combinations thereof; and
the array of pillars comprises niobium oxide, titanium oxide, silicon nitride, or combinations thereof.

20. A metasurface optical device comprising:
a transparent substrate including a first-side and a second-side opposite of the first-side;
a blocking-layer on the substrate, the blocking-layer configured to block light from transmitting therethrough;
an array of metasurface structures located on the first-side of the substrate adjacent to the blocking-layer, the array of metasurface structures including different structures with different dimensions with respect to each other; and
the blocking-layer includes an absorptive-layer configured to absorb the light and a reflective-layer configured to reflect the light the absorptive-layer includes a first-absorptive-layer and a second-absorptive-layer, and the reflective-layer is sandwiched between the first-absorptive-layer and a second-absorptive-layer.

\* \* \* \* \*